United States Patent [19]

Gill

[11] Patent Number: 5,066,029

[45] Date of Patent: Nov. 19, 1991

[54] ANNULAR SEALING APPARATUS

[75] Inventor: David Gill, Otley, England

[73] Assignee: Cooper Industries, Inc., Houston, Tex.

[21] Appl. No.: 604,608

[22] Filed: Oct. 26, 1990

[51] Int. Cl.$^5$ .................. F16J 15/48; F16J 15/56; E21B 33/126

[52] U.S. Cl. ............................ 277/236; 277/74; 277/205; 251/214; 166/212; 166/166

[58] Field of Search .............. 277/236, 27, 34.6, 74, 277/205, 102; 285/917, 95; 251/214; 166/212, 182, 115, 116

[56] References Cited

U.S. PATENT DOCUMENTS

| | | | |
|---|---|---|---|
| 2,164,195 | 6/1939 | Waltermire | 277/34.6 |
| 2,942,666 | 6/1960 | True et al. | 277/34.6 |
| 3,279,806 | 10/1966 | Bialkowski | 277/205 |
| 3,283,823 | 11/1966 | Warrington | 166/182 |
| 3,345,078 | 10/1967 | Bialkowski | 277/236 |
| 4,184,690 | 1/1980 | Brown | 277/102 |
| 4,302,020 | 11/1981 | Morales | 277/205 |
| 4,474,106 | 10/1984 | Durenec | 277/74 X |
| 4,477,087 | 10/1984 | Sutter, Jr. et al. | 277/236 X |
| 4,486,002 | 12/1984 | Riess et al. | 251/214 |
| 4,513,946 | 4/1985 | Priese | 251/173 |
| 4,528,959 | 7/1985 | Hauser, Jr. | 277/236 X |
| 4,585,238 | 4/1986 | Nicholson | 277/205 |
| 4,739,997 | 4/1988 | Smetana | 277/205 X |
| 4,854,600 | 8/1989 | Halling et al. | 277/205 X |
| 4,877,272 | 10/1989 | Chevallier et al. | 277/236 X |

FOREIGN PATENT DOCUMENTS

| | | | |
|---|---|---|---|
| 969210 | 6/1975 | Canada | 277/236 |
| 822572 | 1/1938 | France . | |
| 2300269 | 2/1975 | France | 277/236 |
| 0916836 | 4/1982 | U.S.S.R. | 277/205 |
| 1024698 | 3/1966 | United Kingdom | 277/27 |
| 219670A | 5/1988 | United Kingdom . | |
| 2196706 | 5/1988 | United Kingdom . | |

Primary Examiner—William A. Cuchlinski, Jr.
Assistant Examiner—J. Folker

[57] ABSTRACT

An improved seal for sealing across an annulus between an inner cylindrical sealing surface and an outer cylindrical sealing surface. The seal provides a body and a flange spaced therefrom with an annular flexible arch extending between the body and the flange and having a taper of its thickness so that its thinnest section is at the mid point of the arch and within its sealing area. A suitable sealing is provided to seal against the surface opposite to the surface against which the flexible annular arch seals so that there is a complete sealing across the annulus. This seal is suitable for piston rod sealing, valve stem sealing and for sealing in the annulus between two tubular well members.

10 Claims, 10 Drawing Sheets

ANNULAR SEALING APPARATUS

BACKGROUND

The present invention relates to an improved annular sealing structure or apparatus for sealing across the annulus between two members, such as the annulus surrounding a valve stem and within the packing gland surrounding the valve stem and the annulus within a tubular well string and surrounding the sealing assembly supported therein.

The K. A. Morales U.S. Pat. No. 4,302,020 discloses a toroidal sealing element for sealing between concentric 10 facing cylindrical surfaces. The sealing element is U-shaped in section and includes an actuator ring having a tapered nose which engages within the gap of the sealing element to deflect its arms outward into sealing engagement with the inner and outer sealing surfaces.

The J. E. Brown U.S. Pat. No. 4,184,690 discloses an annular shaft seal which has two legs joined at an outer apex. The legs seal on their end surfaces against the shaft and on their outer surfaces against the cylinder and cap. Fluid passages are provided in the legs to provide pressure equalization across the seal.

The W. K. Priese U.S. Pat. No. 4,513,946 discloses a convoluted seal ring for a butterfly valve with sealing at the top of each convolution.

The T. P. Nicholson U.S. Pat. No. 4,585,238 discloses a seal having a body with diverging legs and with an outer jacket of yieldable low friction material and an inner energizing spring between the legs.

The L. S. Bialkowski U.S. Pat. No. 3,279,806 discloses a U-shaped metal seal with legs having projections for sealing against inner and outer cylindrical sealing surfaces.

None of these references suggests that a seal could be provided in which the sealing element was an annular metal member having an annular arch which tapers from its ends toward its center so that its sealing surface is at its point of minimum thickness.

SUMMARY

The present invention includes an improved annular metal seal having a body with a pair of flanges and a tapering arch between the flanges and tapering so that its thinnest portion is at the midpoint of the arch. The annulus in which the improved seal of the present invention operates is between facing cylindrical surface on a first member and a second member. Sealing with a cylindrical sealing surface of the first member is provided by the convex side of the annular arch at its midpoint. The seal body is suitably supported and in sealing engagement with the second member.

An object of the present invention is to provide an improved annular metal seal apparatus with improved sealing efficiency.

A further object is to provide an improved annular metal seal apparatus which can seal against a reciprocating shaft without scraping the lubricant from the shaft.

Another object is to provide an improved annular metal seal apparatus which is simple to install and has a relatively long service life.

BRIEF DESCRIPTION OF THE DRAWINGS

These and other objects and advantages are hereinafter set forth with respect to the drawings wherein.

DESCRIPTION OF THE PREFERRED EMBODIMENTS

Figure 1:
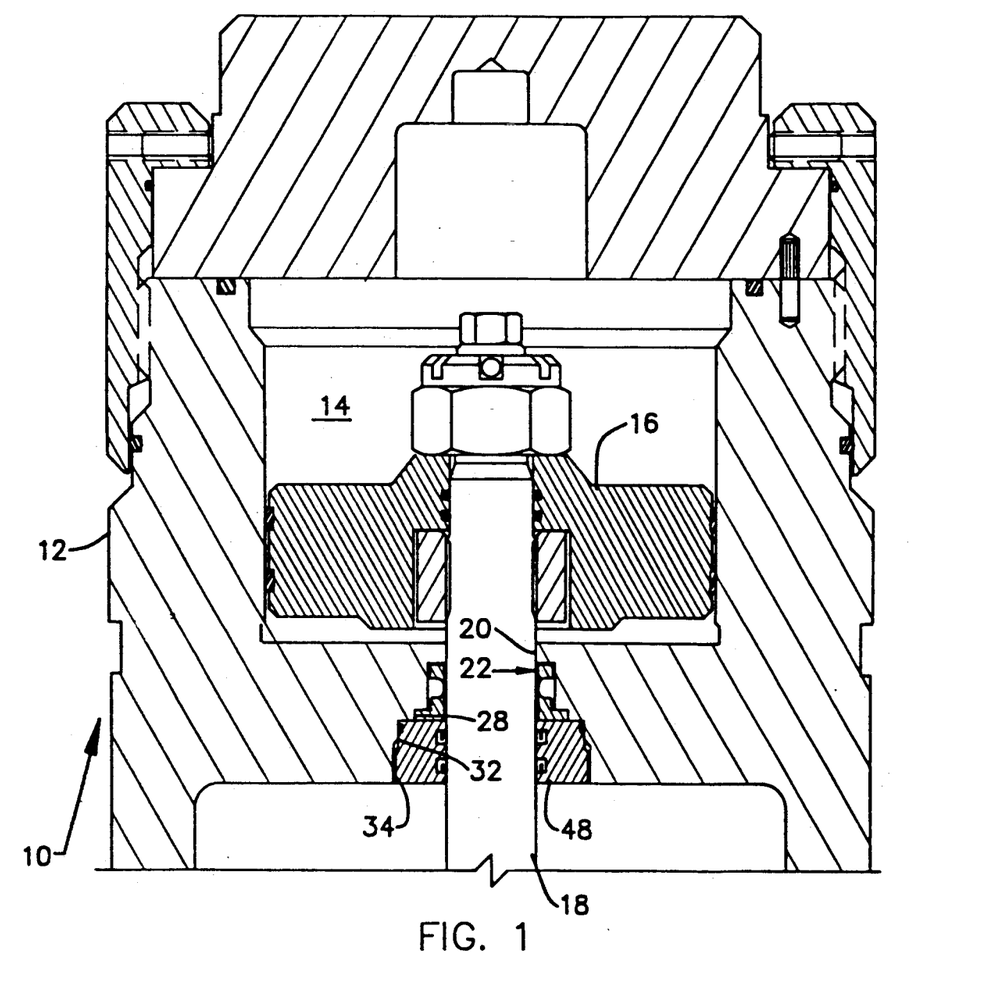
FIG. 1 is a sectional view of a reciprocating piston rod in a body with the improved annular seal of the present invention installed therein.
Figure 2:
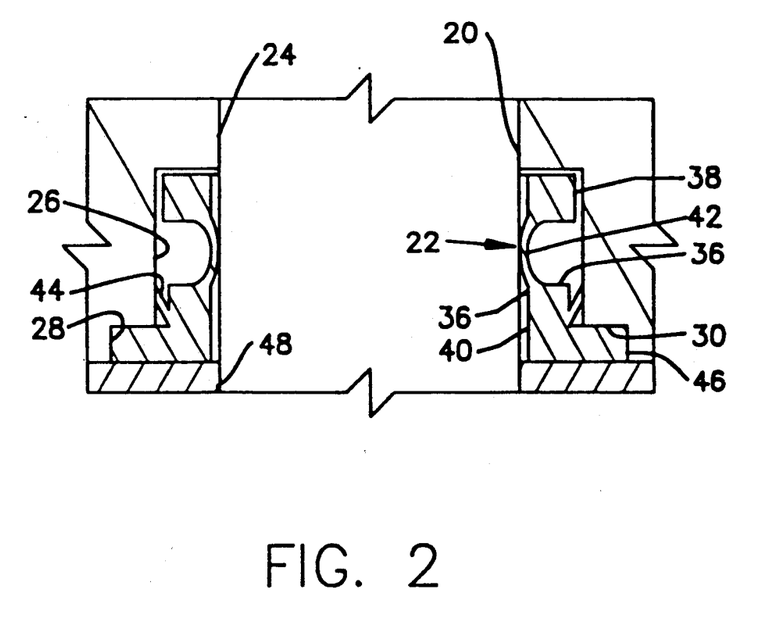
FIG. 2 is an enlarged sectional view of the improved annular seal shown in FIG. 1.

Actuator 10 illustrated in FIG. 1 includes body 12 defining a piston chamber 14 in which piston 16 is positioned for reciprocation. Piston rod 18 extends through piston 16 and is secured in such position so that it moves with piston 16 to transmit the movement thereof to a device to which rod 18 is connected, such as a valve member or a blowout preventer ram (not shown). Body 12 is formed to have opening 20 at the end of chamber 14 and piston rod 18 extends through opening 20. Improved annular seal 22 is positioned in opening 20 for sealing between the interior wall of opening 20 and the exterior of piston rod 18. As shown in FIGS. 1 and 2, opening 20 includes a stepped bore having a first bore 24 closely surrounding the exterior of piston rod 18, second bore 26 spaced therefrom, third bore 28 providing shoulder 30, fourth bore 32 and fifth bore 34, all as hereinafter described. Improved annular seal 22 is positioned in second bore 26 and includes annular body 36 with first flange 38 positioned near the shoulder between first and second bores 24 and 26, second flange 40 spaced axially from first flange 36 and joined thereto by inwardly extending sealing arch 42, external seal lip 44 extending outwardly and upwardly from the exterior of second flange 40 for sealing against the inner surface of second bore 26 and collar 46 extending outwardly from second flange 40 and clamped against the shoulder 30 between second and third bores 26 and 28 by plug 48 which is threaded into fifth bore 34 and sealed within fourth bore 32 and against the exterior of rod 18.

Sealing arch 42 is shaped to have thicker portions near flanges 38 and 40 and to become thinner toward its central portion. The convex side of arch 42 is adapted to provide sealing engagement with the interior of its central portion. Seal 22 is designed to have an interference fit between the interior of the seal arch 42 and the exterior of rod 18. With this configuration seal 22 is mechanically deformed due to the interference and also is further deformed by the fluid pressure from piston chamber 14 which is exerted on the exterior, concave side of seal 22. Seal lip 44 prevents the leakage of such pressure beyond the sealing engagement of seal lip 44 with the interior of second bore 26. The shape and reduced section of annular arch 42 makes it a flexible member having its minimum thickness at the point of contact with the exterior of rod 18. The further deformation of the annular arch 42 by the fluid pressure results in more of the operative length of arch 42 being brought to bear on the exterior of rod 18 and the region of the thinnest arch section remains the maximum pressure region of the seal against the exterior of the rod 18.

Figure 3:
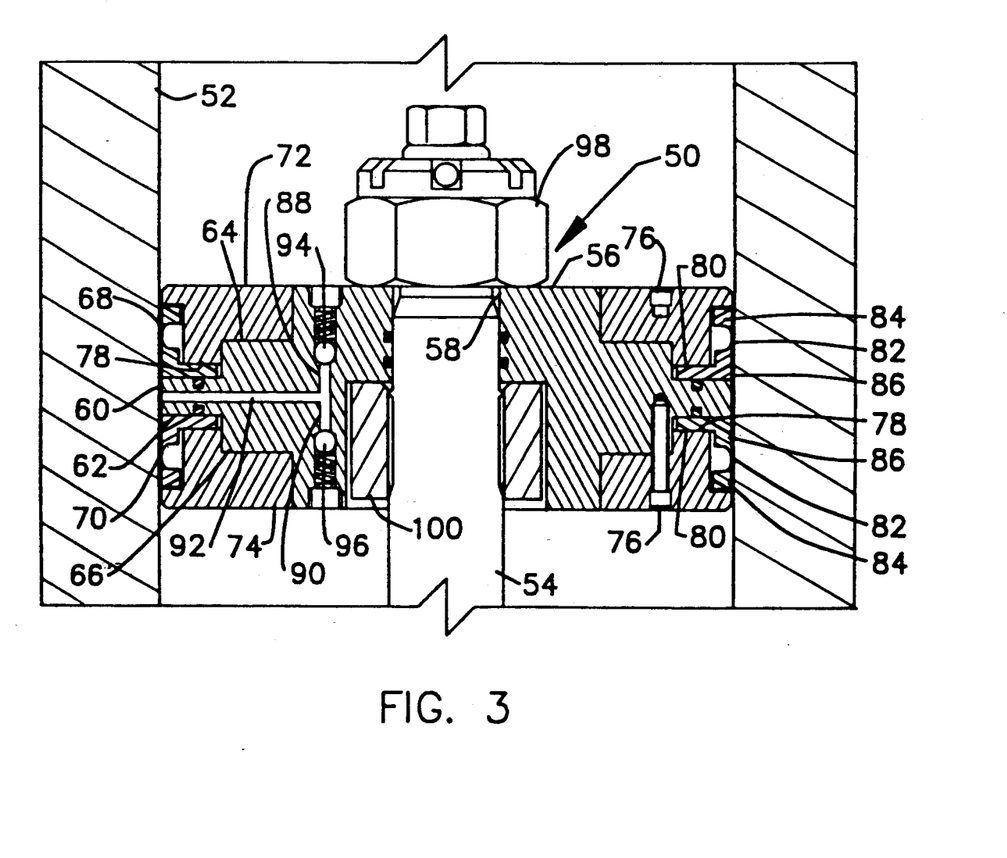
FIG. 3 is a sectional view of a reciprocating piston having the improved annular seal installed for sealing between the exterior of the piston and the cylinder wall with two of the improved annular seals being used for sealing against pressure from either direction.

Piston 50, shown in FIG. 3, is positioned within cylindrical bore 52 for, reciprocation therein and is connected to rod 54 which transmits the motion of piston 50 responsive to fluid pressure on its opposite sides to suitable means (not shown) which is to be moved or actuated thereby. Piston 50 includes body 56 having bore 58 through which connecting rod 54 extends and an exterior surface including upper and lower outer shoulders 60 and 62 and upper and lower inner shoulders 64 and 66 spaced inwardly from shoulders 60 and 62. A pair of improved annular seals 68 and 70 of the present invention are positioned against outer shoulders 60 and 62, respectively, and are held in position for sealing against the wall of bore 52 by rings 72 and 74 which are secured to piston body 56 by cap screws 76 as shown. Rings 72 and 74 include annular projection 78 which engages inwardly extending annular skirts 80 on seals 68 and 70 to retain them in their desired position so that the outer portion of arch 82 is in engagement with the interior of bore 52 with the usual slight interference fit. Seals 68 and 70 are similar to seal 22 and include flanges 84 and 86 at each end of flexible arch 82. Piston body 56 includes passages 88 and 90 extending from opposite sides thereof which both communicate with radially extending passage 92 which extends to the outer periphery of body 56 at a position between seals 68 and 70. Check valves 94 and 96 are positioned in passages 88 and 90 to allow flow therethrough only in the direction toward the side of body 56 which is not subject to fluid pressure used for the moving of piston 50. With this structure of passages, any pressure which accumulates between seals 68 and 70 is exhausted to the vented side of piston 50 and check valves 94 and 96 prevent the flow of fluid therein from the pressurized side of piston 50. Piston 50 is retained on rod 54 by nut 98 and collar 100 which are threaded onto rod 54.

Seals 68 and 70 are generally the same shape and configuration as seal 22 and function similarly in that pressure which can gain access to the interior of the annular arches 82 causes the arches 82 to be deformed outwardly into tighter and more extensive sealing engagement with the interior of bore 52.

Figure 4:
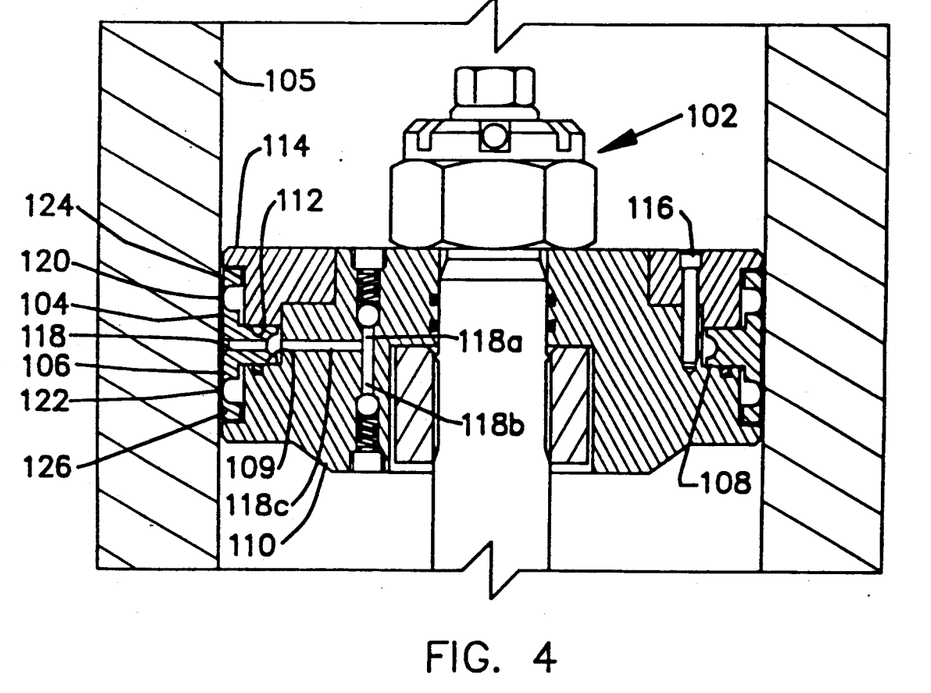
FIG. 4 is a sectional view of a reciprocating piston having a modified form of the improved annular seals in a combined form for sealing against pressure from either direction.
Figure 5:
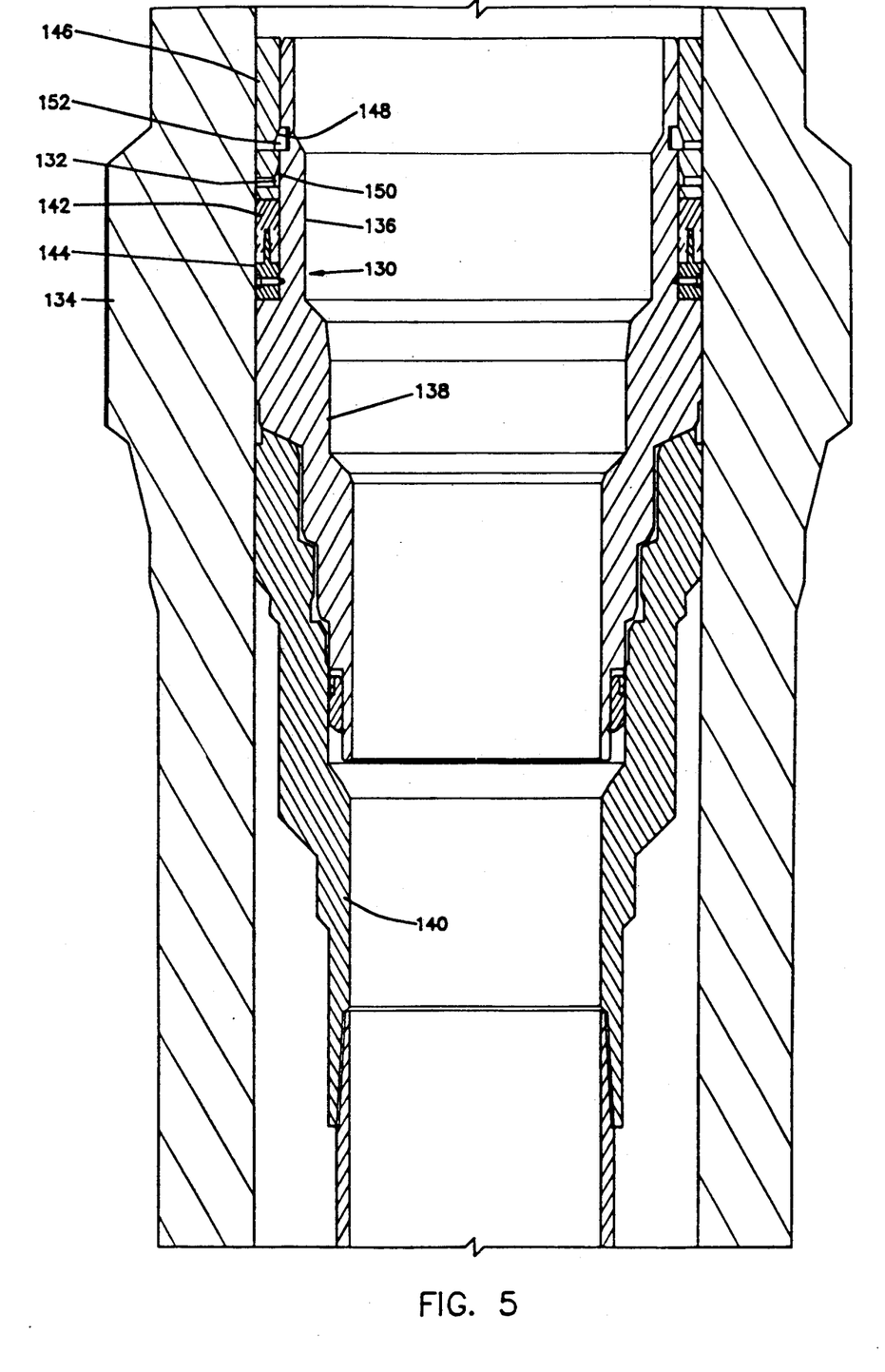
FIG. 5 is a sectional view of a well string with the improved annular seal of the present invention being positioned for sealing across the annular space between the interior of the outer tubular member and the exterior of the inner tubular member.

Piston 102, shown in FIG. 4 is similar to piston 50 with the exception that seals 68 and 70 used on piston 50 have been combined into a single structure seal 104 forming the dual purpose of sealing against the interior of bore 105. Seal 104 includes body 106 having inner skirt 108 which is clamped between shoulder 109 on piston body 110 by projection 112 on ring 114. Cap screws 116 secure ring 114 to piston body 110. Seal body 106 includes radial port 118 which communicates from valved passages 118a, 118b and 118c in body 110 to the exterior of seal body 106 between upper arch 120 and lower arch 122. Upper arch 120 extends between the outer portion of skirt 108 to upper flange 124 and lower arch 122 extends between the outer portion of skirt 108 and lower flange 126. Arches 120 and 122 are the flexible tapering arches such as described with respect to seal 22 and seals 68 and 70.

Annulus sealing means 130 shown in FIGS. 5, 6, 7, and 8 is positioned in annulus 132 between the interior of a wellhead 134 and the exterior of upstanding rim 136 on seal body 138 which is landed on tubing hanger 140 or other well device, such as a casing hanger. Annulus sealing means includes seal ring 142, setting ring 144 and setting sleeve 146. The interior surface of setting sleeve 146 includes annular recesses 148 and 150 to coact with snap ring 152 to lock setting sleeve 146 against upward movement after snap ring 152 has been received within upper recess 148. This locks setting sleeve 146, seal ring 142 and setting ring 144 in their set positions. Lower recess 150 secures setting sleeve 146 against movement during the lowering of annulus sealing means into its position within annulus 132.

Figure 6A:
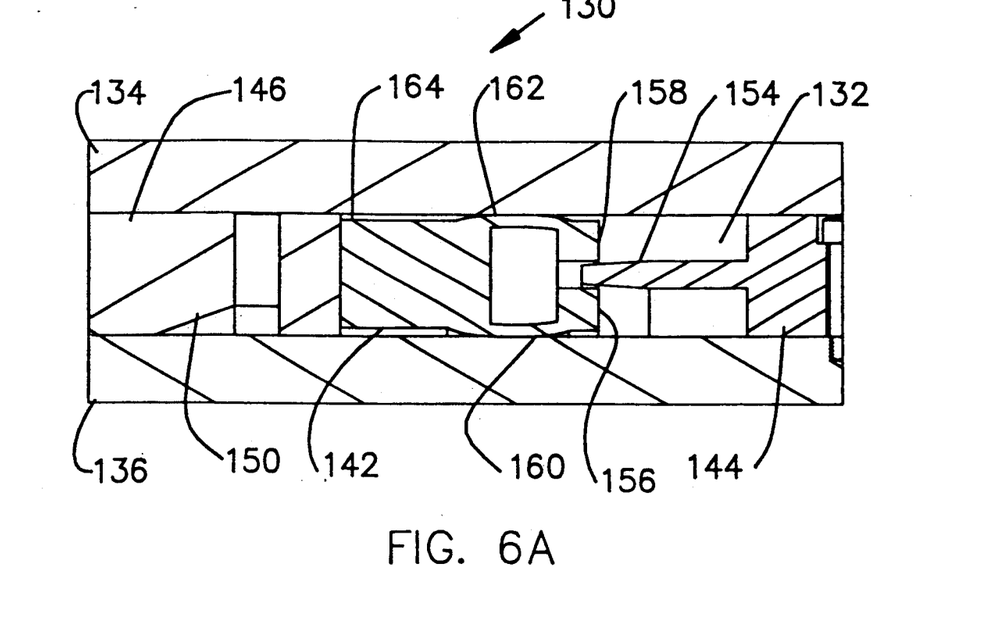
FIG. 6A is an enlarged sectional view illustrating the improved annular seal shown in FIG. 5 in its unset position.
Figure 6B:
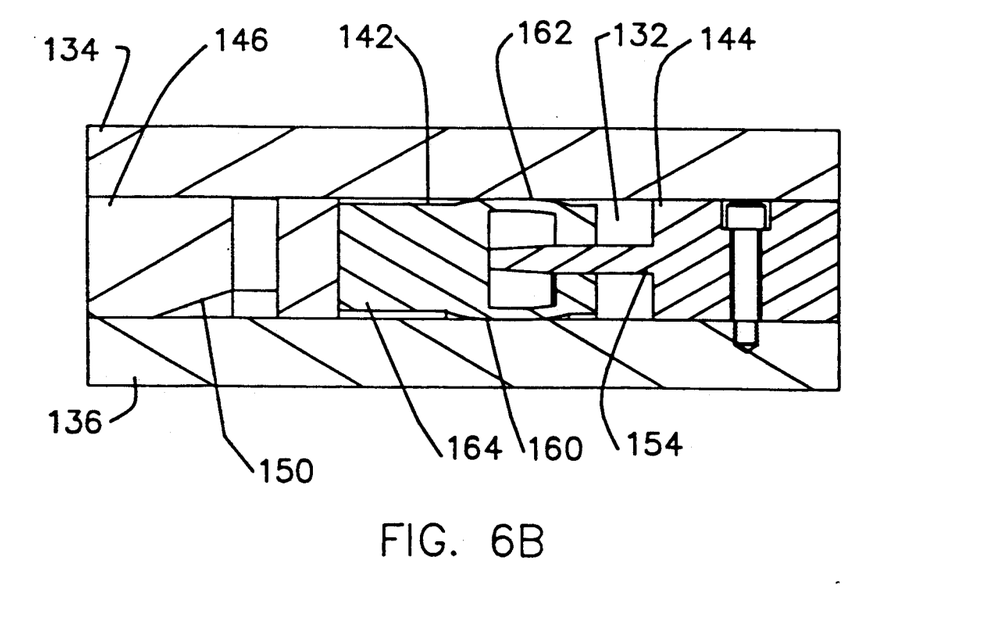
FIG. 6B is an enlarged sectional view illustrating the improved annular seal shown in FIGS. 5 and 6A in its set position.

Annulus sealing means 130 is illustrated in FIG. 6A in its unset position before the lowering of setting sleeve 146. In this position, setting rim 154 which extends above setting ring 144 is positioned between inner and outer flanges 156 and 158 of seal ring 142. The upper end of setting rim 154 has both inner and outer tapers as shown so that when it is moved into the space between flanges 156 and 158 it wedges them outwardly to cause flexible inner and outer arches 160 and 162 to be deformed against the inner and outer surfaces of annulus 132. As shown, seal ring 142 includes upper ring body 164 having inner flexible arch 160 extending to inner flange 156 and outer flexible arch 162 extending to outer flange 158. Both arches 160 and 162 are similar to the sealing arches previously described and have a reduced thickness of section approaching their central thinnest sealing sections. Inner arch 160 has its convex side or sealing surfaces facing inwardly to engage the exterior surface of rim 136 and outer arch 162 has its convex side or sealing surface facing outwardly to engage the interior surface of wellhead 134. The sealing position of seal ring 142 is illustrated in FIG. 6B.

Figure 7:
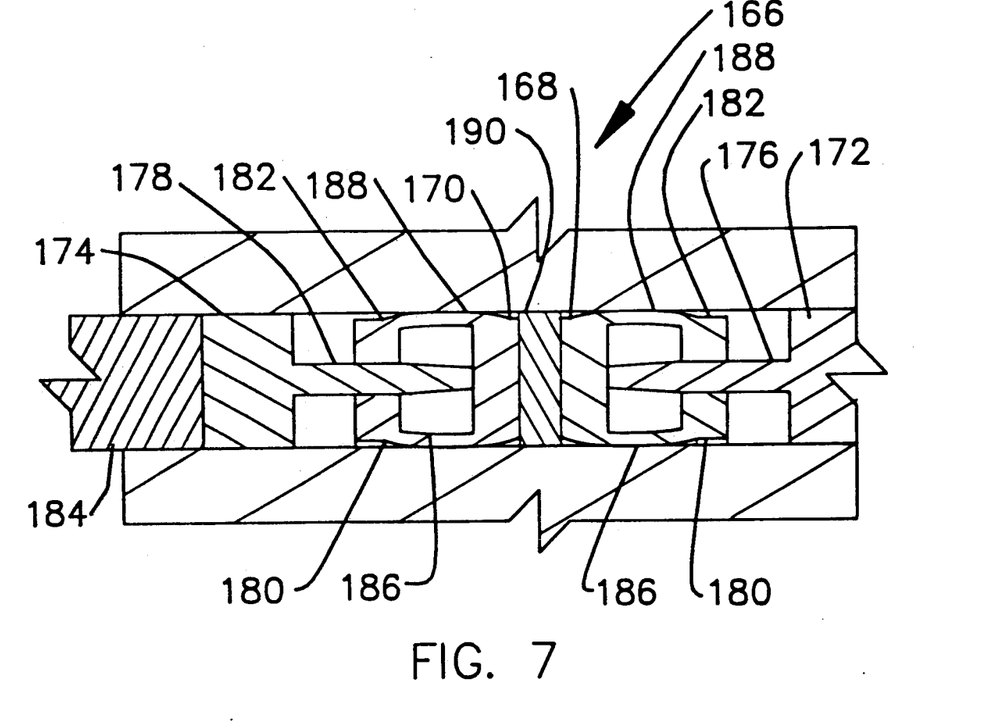
FIG. 7 is an enlarged sectional view of a modified form of the improved dual annular seal used to seal across a well annulus.

A modified form of annulus sealing means 130 is illustrated in FIG. 7 as annulus sealing means 166 which is similar to sealing means 130 except that it includes a pair of seal rings 168 and 170 and a pair of setting rings 172 and 174 which are positioned to have rims 176 and 178 of setting rings 172 and 174 positioned in the openings between inner and outer flanges 180 and 182 of each of seal rings 168 and 170. In this manner as setting sleeve 184 is forced downwardly, it forces rims 176 and 178 to wedge the outer flanges of each seal ring 168 and 170 apart to bring flexible arches 186 and 188 into sealing engagement with their respective sealing surfaces on the opposite surfaces of the annulus. One additional element used with sealing means 166 is ring 190 which is positioned between sealing rings 168 and 170 as shown. Each of flexible sealing arches 184 and 186 is shaped and functions in the manner previously described with respect to seal ring arches 160 and 162, 120 and 122, 82 and 42.

Figure 8A:
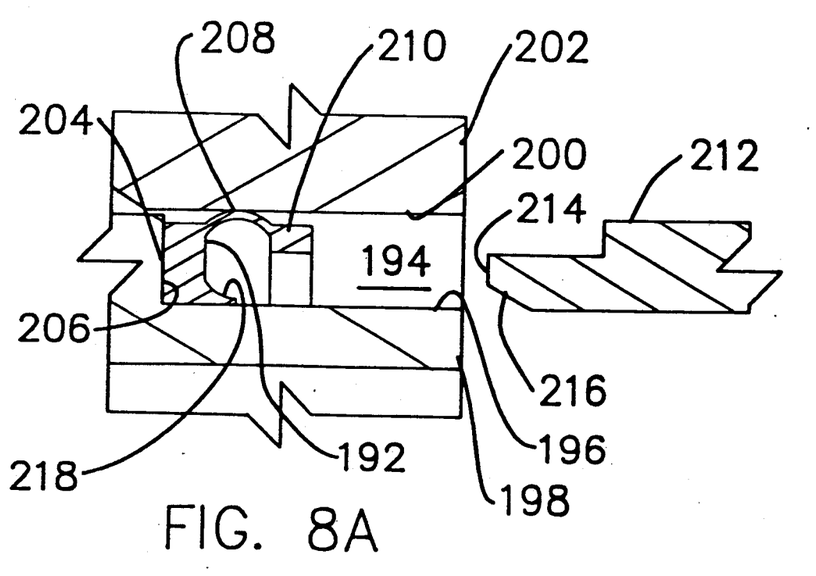
FIG. 8A is a detailed sectional view of an improved annular seal and its actuator in unset position.
Figure 8B:
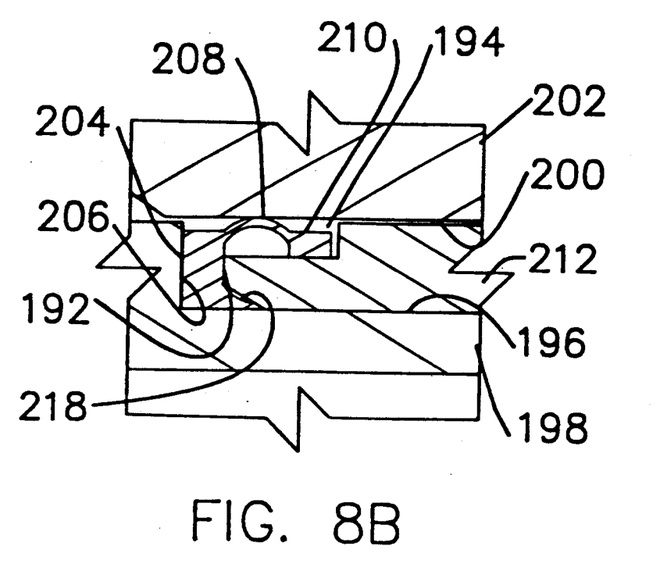
FIG. 8B is a detailed sectional view of the improved annular seal shown in FIG. 8A in its set position.

Seal ring 192 shown in FIGS. 8A and 8B is positioned in annulus 194 between surface 196 of member 198 and surface 200 of member 202. Body 204 of ring 192 is supported against shoulder 206 on member 198 and flexible arch 208 extends from body 204 to flange 210 and is of the preferred flexible arch shape to taper to its central sealing section. Setting ring 212 is provided to coact with seal ring 192 and includes rim 214 which has surface 216 which is tapered as shown. Body 204 includes lip portion 218 which is adjacent surface 196 and coacts with tapered surface 216 of setting ring 212 which when actuated engages the tip of lip portion 218 and wedge it toward surface 196. Also, setting ring 212 when in set position urges seal ring body 204 against shoulder 206 to assist in providing a sealing engagement with shoulder 206.

Figure 9:
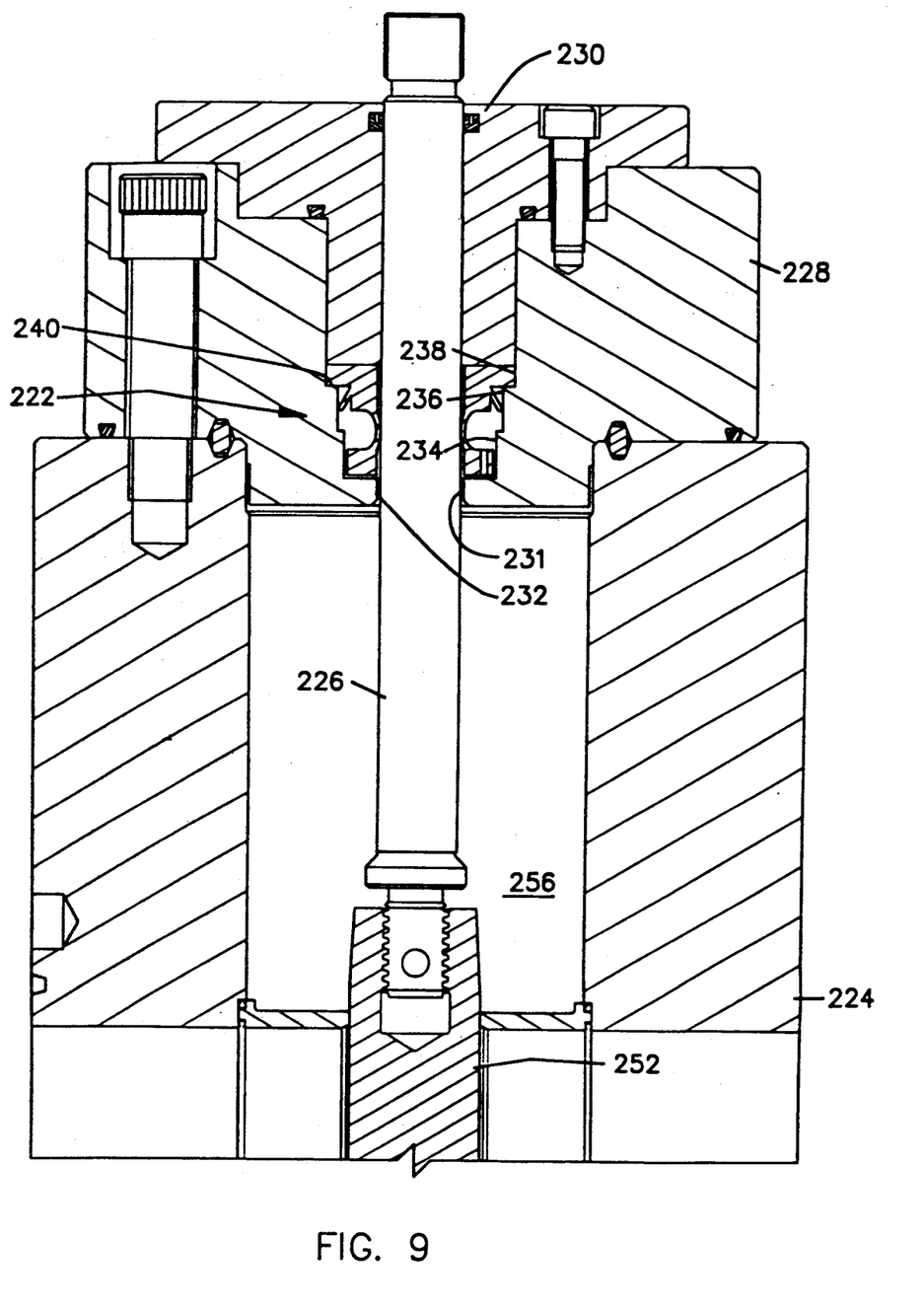
FIG. 9 is a sectional view of a gate valve with the improved annular seal of the present invention installed around the valve stem.
Figure 10:
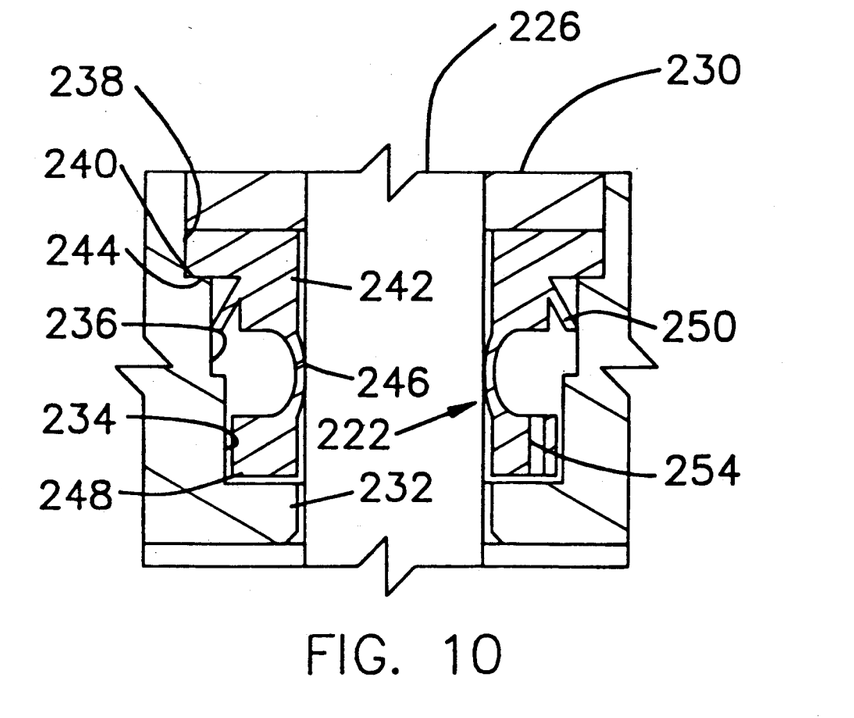
FIG. 10 is an enlarged detail sectional view of the improved annular seal shown in FIG. 9.

Valve stem seal 222 illustrated in FIGS. 9 and 10 is similar to annular seal 22 shown in FIGURES 1 and 2. It is shown installed on valve 224 in surrounding relationship to valve stem 226 in bonnet 228 and is retained therein by gland ring 230. The interior of bonnet 228 includes stepped opening 231 which includes first bore 232 through which valve stem 226 extends, second bore 234, third bore 236 and fourth bore 238 with shoulder 240 formed between third bore 236 and fourth bore 238. Stem seal 222 includes body 242 with outwardly extending flange 244 and flexible arch 246 (similar to the structure of the flexible arches previously described) having its convex portion facing inwardly for sealing engagement with valve stem 226 and extending to outer flange 248. Sealing lip 250 is provided on the exterior of body 242 and tapers downwardly and outwardly for sealing against the surface of third bore 236.

Valve stem seal 222 is suitable for sealing against valve stem 226 when it is a rotating type of stem, i. e., it rotates to cause the valve member 252 to change its position. When installed as shown, the inner end of gland ring 230 engages the upper end of seal ring body 242 and clamps flange 244 against shoulder 240. Port 254 extends through flange 248 to allow pressure to be transmitted from the valve chamber 256 into the exterior of flexible arch 246 so that it urges the central portion of flexible arch 246 into tight sealing engagement with the exterior surface of valve stem 226. It should be noted that valve stem seal could be utilized for sealing around the exterior of a valve stem which reciprocates to cause valve movement rather than rotating. In each case sealing lip 250 provides the seal against the surface of third bore 236 so that fluids under pressure cannot pass around the exterior or interior of valve stem seal 222.

What is claimed is:

1. An annular sealing apparatus for sealing across an annulus between a first member and a second member with one of said members having a cylindrical sealing surface comprising an annular metal seal body having a pair of spaced apart annular flanges and an annular arch extending between said flanges and toward said cylindrical sealing surface of said one of said members, said arch being relatively thick adjacent said flanges and including a thin portion that is progressively thinner toward its apex so that an area of sealing contact with said cylindrical surface of said one of said members is in the thin portion of the arch, and said arch having a shape which has a relatively small radial height toward the sealing surface with respect to its axial length, said annular metal seal body having sealing engagement means for sealing engagement with a portion of the other of said members.

2. An apparatus according to claim 1 wherein said one of said members is a shaft having said cylindrical sealing surface on its exterior, and said other member is an annular housing surrounding a portion of said shaft and supporting said annular seal body in sealing engagement between said shaft and said housing.

3. An apparatus according to claim 1 wherein said one of said members is a valve stem having said cylindrical sealing surface on its exterior, and the other member is an annular gland surrounding a portion of said valve stem and supporting said annular seal body in sealing engagement between said valve stem and said gland.

4. An apparatus according to claim 1 wherein said one of said members is a part of a tubular well string and has said cylindrical sealing surface on its interior, and the other of said members is a hanger seal assembly within said tubular well string and supports said annular seal body in sealing engagement between said cylindrical sealing surface on the interior of said tubular well string and the exterior of said hanger seal assembly.

5. An apparatus according to claim 1 including means carried by said other member for supporting said annular seal body in sealing engagement between said first and second members.

6. An apparatus according to claim 1 including means on said annular seal body conducting fluids under pressure to the concave side of said arch so that said pressure urges said arch toward said cylindrical sealing surface.

7. An apparatus according to claim 1 including an annular sealing rim extending from one of said flanges for sealing engagement with the other member.

8. An annular sealing apparatus to provide sealing against an interior surface for a structure reciprocating within said interior surface comprising an annular metal seal body having a first, a second and a third annular flange being axially spaced within said interior surface, a first annular arch extending between said first and second flanges and having its convex surface facing toward said interior surface, a second annular arch extending between said second and third flanges and having its convex surface facing toward said interior surface, said arches each being relatively thick adjacent said flanges and including a thin portion that is progressively thinner toward its apex so that an area of sealing contact with said interior surface is in the thin portion of the arch, and said annular metal seal body having sealing engagement means for sealing engagement with said reciprocating structure.

9. An annular sealing apparatus according to claim 8 including a passage extending radially outward through said reciprocating structure, a pair of passages extending axially through said reciprocating structure and in communication with the inner end of said radially extending passage, and means preventing the flow of fluids under pressure through said axially extending passages into said radially extending passage and allowing flow from said radially extending passage out of said axially extending passage, said radially extending passage communicating with a space between said sealing arches adjacent said interior surface so that any increase of pressure therein is bled to a vented side of said reciprocating structure.

10. An annular sealing apparatus to provide sealing against an interior surface for a structure reciprocating within said interior surface comprising a pair of annular metal seal bodies, the first body having a first and a second annular flange being axially spaced within said interior surface and an annular arch extending between said first and second flanges and having its convex surface facing toward said interior surface, the second body having a third and a fourth annular flange being axially spaced within said interior surface and an annular arch extending between said third and fourth flanges and having its convex surface facing toward said interior surface, said arches each being relatively thick adjacent said flanges including a thin portion that is progressively thinner toward its apex so that an area of sealing contact with said interior surface is in the thin portion of the arch, and said annular metal seal body having sealing engagement means for sealing engagement with said reciprocating structure, a passage extending radially outward through said reciprocating structure, a pair of passages extending axially through said reciprocating structure and in communication with an inner end of said radially extending passage, and means preventing the flow of fluids under pressure through said axially extending passages into said radially extending passage and allowing flow from said radially extending passage out of said axially extending passages, said radially extending passage communicating with a space between said sealing arches adjacent said interior surface so that any increase of pressure therein is bled to a vented side of said reciprocating structure, said second annular flange being spaced axially from said fourth annular flange with a radial space therebetween communicating from a radially outer end of said radially extending passage to the space between said first and second annular arches.

* * * * *